United States Patent
Minami et al.

(10) Patent No.: US 9,538,024 B2
(45) Date of Patent: Jan. 3, 2017

(54) PORTABLE TERMINAL AND RECORDING MEDIUM THAT HANDLES TARGET IMAGE DATA AND SCANNED IMAGE DATA AS SINGLE DATA

(71) Applicant: KYOCERA Document Solutions Inc., Osaka (JP)

(72) Inventors: Takahiro Minami, Osaka (JP); Akira Yuki, Osaka (JP); Daisuke Yoshida, Osaka (JP); Satoshi Kawakami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/958,362

(22) Filed: Dec. 3, 2015

(65) Prior Publication Data

US 2016/0191728 A1    Jun. 30, 2016

(30) Foreign Application Priority Data

Dec. 26, 2014  (JP) ................................. 2014-264240

(51) Int. Cl.
*G06F 3/12* (2006.01)
*H04N 1/00* (2006.01)
(Continued)

(52) U.S. Cl.
CPC ........ *H04N 1/00307* (2013.01); *H04N 1/2104* (2013.01); *H04N 1/387* (2013.01);
(Continued)

(58) Field of Classification Search
CPC ............................ H04N 1/00307; H04N 1/387
See application file for complete search history.

(56) References Cited

U.S. PATENT DOCUMENTS

2009/0237728 A1* 9/2009 Yamamoto ............ G06F 3/1454
358/1.15
2010/0331041 A1* 12/2010 Liao .................. H04M 1/72555
455/556.1

(Continued)

FOREIGN PATENT DOCUMENTS

JP    2002-271558 A    9/2002
JP    2013-143703 A    7/2013
(Continued)

*Primary Examiner* — Benjamin O Dulaney
(74) *Attorney, Agent, or Firm* — Stein IP, LLC

(57) ABSTRACT

A portable terminal includes a storage circuit, a communication circuit, a reading instruction circuit, a target-selection accepting circuit, a scanned-image data acquiring circuit, and a combined image data generating circuit. The reading instruction circuit instructs the scanner to read the document image. The target-selection accepting circuit accepts selection of target image data from the image data inside the storage circuit. The scanned-image data acquiring circuit acquires the scanned-image data from the scanner. The scanned-image data is generated by the reading of the document image by the scanner. The combined image data generating circuit generates single combined image data with a plurality of pages by combining the scanned image data with the target image data, and acquires the combined image data instead of the scanned image data.

6 Claims, 13 Drawing Sheets

(51) Int. Cl.
*H04N 1/21* (2006.01)
*H04N 1/387* (2006.01)
(52) U.S. Cl.
CPC ............... *H04N 2201/0081* (2013.01); *H04N 2201/0094* (2013.01)

(56) References Cited

U.S. PATENT DOCUMENTS

| | | | |
|---|---|---|---|
| 2012/0075485 A1* | 3/2012 | Mizutani | H04M 1/7253 348/207.1 |
| 2012/0075670 A1* | 3/2012 | Yamaguchi | H04N 1/00411 358/1.15 |
| 2014/0320919 A1* | 10/2014 | Kowaka | H04N 1/0044 358/1.15 |
| 2014/0320931 A1 | 10/2014 | Okamoto | 358/448 |
| 2014/0376045 A1* | 12/2014 | Oyoshi | H04N 1/32128 358/1.15 |
| 2015/0138597 A1* | 5/2015 | Koshigaya | H04N 1/00973 358/1.15 |
| 2015/0146224 A1* | 5/2015 | Shimamura | H04N 1/448 358/1.13 |
| 2015/0181050 A1* | 6/2015 | Nishii | H04N 1/00307 358/1.15 |
| 2015/0288849 A1* | 10/2015 | Tredoux | H04N 1/32464 358/1.15 |

FOREIGN PATENT DOCUMENTS

| | | |
|---|---|---|
| JP | 2013-196131 A | 9/2013 |
| JP | 2014-49910 A | 3/2014 |
| JP | 2014-216968 A | 11/2014 |

\* cited by examiner

33

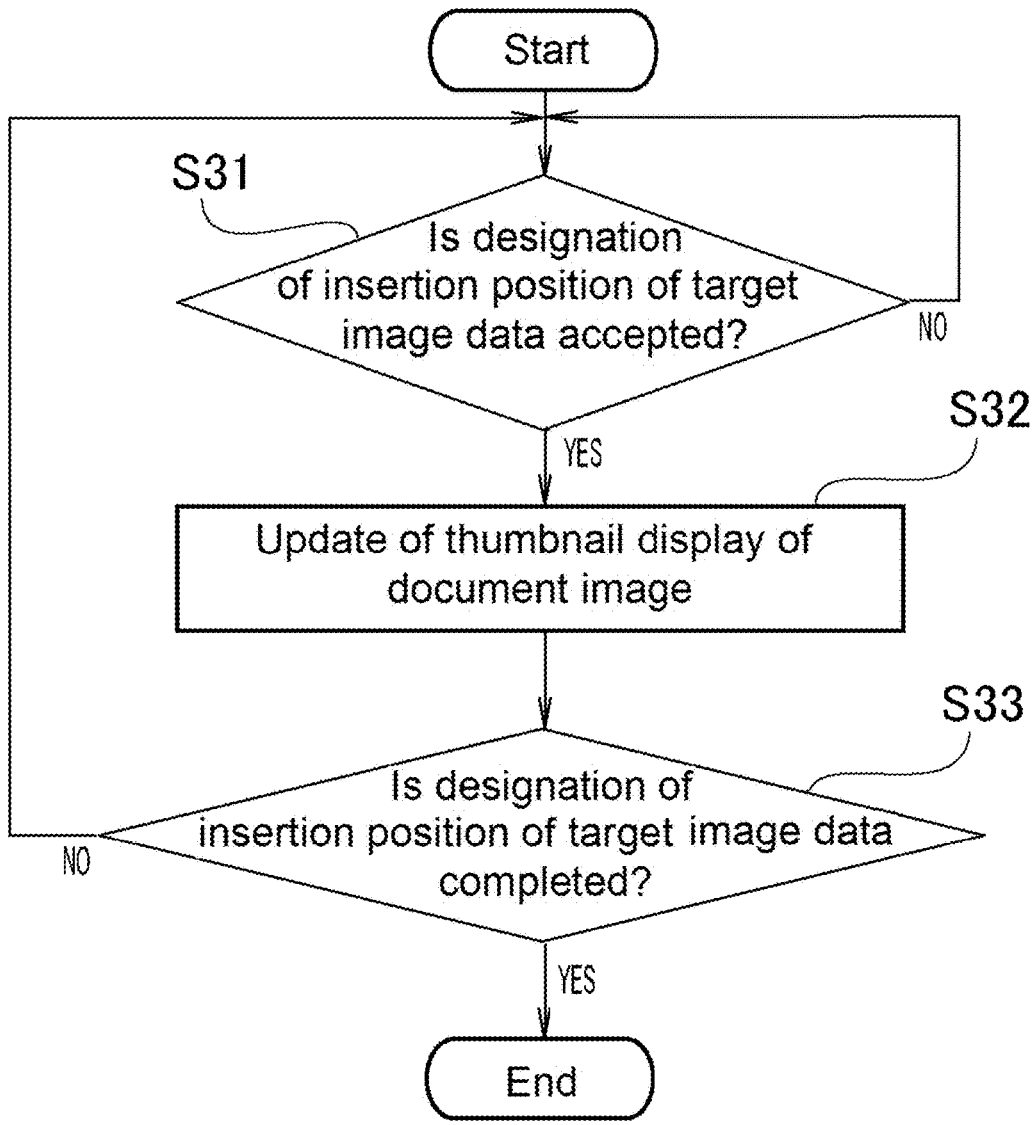

PORTABLE TERMINAL AND RECORDING MEDIUM THAT HANDLES TARGET IMAGE DATA AND SCANNED IMAGE DATA AS SINGLE DATA

INCORPORATION BY REFERENCE

This application is based upon, and claims the benefit of priority from, corresponding Japanese Patent Application No. 2014-264240 filed in the Japan Patent Office on Dec. 26, 2014, the entire contents of which are incorporated herein by reference.

BACKGROUND

Unless otherwise indicated herein, the description in this section is not prior art to the claims in this application and is not admitted to be prior art by inclusion in this section.

In use of scanned image data of a document image read by a scanner, the scanned image data may be transmitted to other terminals via a typical portable terminal such as a mobile phone.

For example, a typical portable terminal transmits scanned image data to a portable terminal from a digital copying machine with a scanner via short range communications, and transmits the received scanned image data to other terminals from the portable terminal via e-mail.

Here, typical portable terminals often store imaged image data by widely spread camera function.

In view of this, a user may desire to transmit image data stored in a typical portable terminal to other terminals together with scanned image data.

However, the above-described technique can only transmit image data stored in a typical portable terminal and scanned image data to other terminals as separate data.

Accordingly, the above-described technique is required to handle both of the image data separately.

SUMMARY

A portable terminal according to an aspect of the disclosure includes a storage circuit, a communication circuit, a reading instruction circuit, a target-selection accepting circuit, a scanned-image data acquiring circuit, and a combined image data generating circuit. The storage circuit includes an area storing image data. The communication circuit ensures data communication with a scanner. The scanner reads a document image and generates scanned image data. The reading instruction circuit instructs the scanner to read the document image. The target-selection accepting circuit accepts selection of target image data from the image data inside the storage circuit. The scanned-image data acquiring circuit acquires the scanned-image data from the scanner. The scanned-image data is generated by the reading of the document image by the scanner. The combined image data generating circuit generates single combined image data with a plurality of pages by combining the scanned image data with the target image data, and acquires the combined image data instead of the scanned image data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 13 illustrates steps of an insertion-position designating processing according to Embodiment 3.

DETAILED DESCRIPTION

Figure 1:
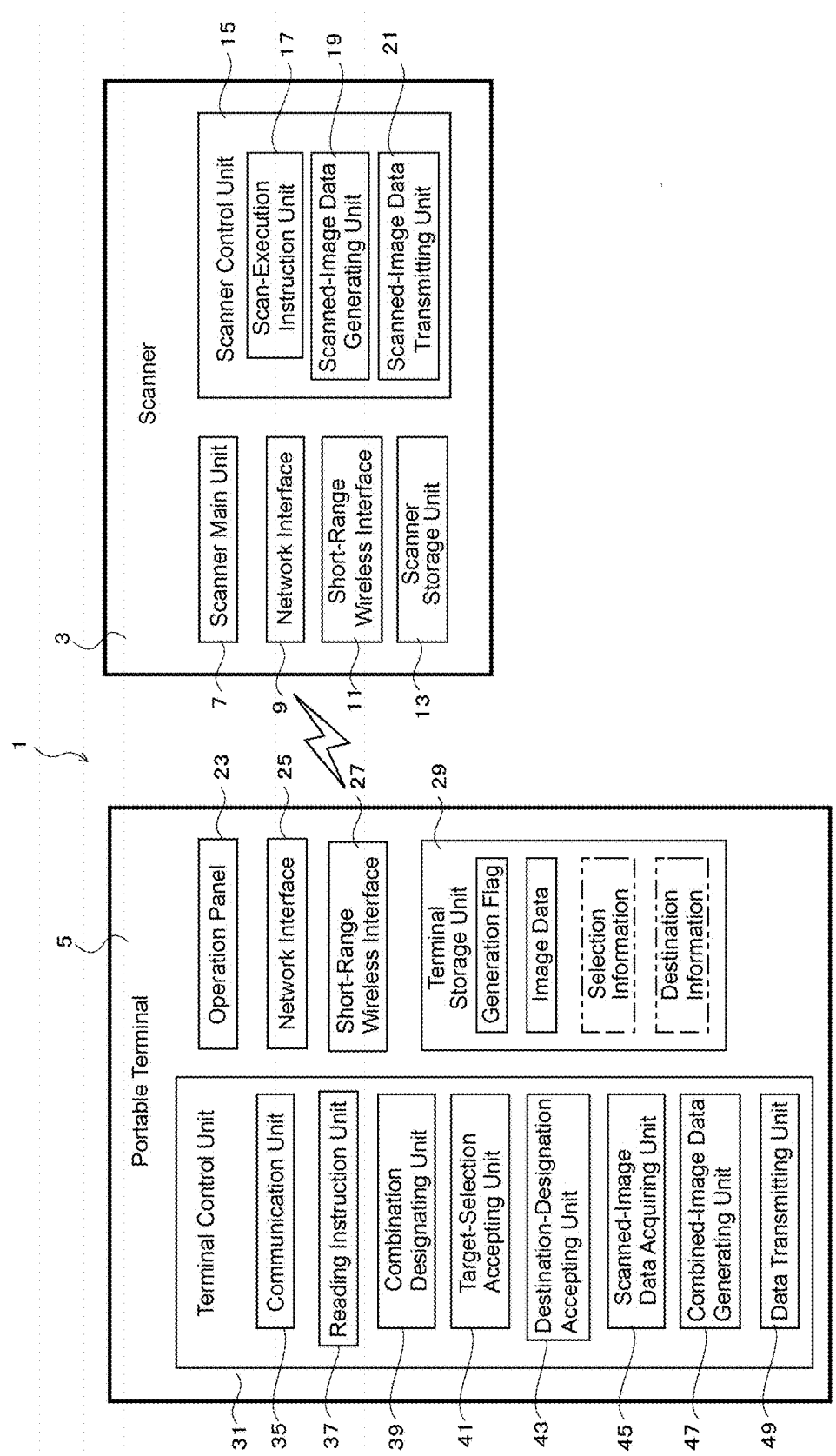
FIG. 1 illustrates an image combining system using a portable terminal according to Embodiment 1 of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

An objective that enables to handle image data stored in a portable terminal and scanned image data by a scanner as single data is achieved as follows: a portable terminal generates single combined image data with a plurality of pages by combining the image data stored in the portable terminal with scanned image data received from a scanner, and acquires the generated combined image data instead of the scanned image data.

Image Combining System of Embodiment 1

FIG. 1 illustrates an image combining system using a portable terminal according to Embodiment 1 of the disclosure.

An image combining system 1 includes a scanner 3 and a portable terminal 5, which can perform data communication with one another.

The scanner 3 is a scanner device, and may be not only a scanner-only device but also a scanner device located in an image forming apparatus such as a printer and a digital multi-functional peripheral. The scanner 3 of Embodiment 1 includes a scanner main unit 7, a network interface 9, a short-range wireless interface 11, a scanner storage unit 13, a scanner control unit 15, and similar unit.

The scanner main unit 7 is a mechanism unit that reads a document image to convert it to an electrical signal.

The network interface 9 is a module that connects the scanner 3 to a network such as the Internet via wired or wireless communication and enables data communication with the portable terminal 5.

The short-range wireless interface 11 is a module that connects the scanner 3 to the portable terminal 5 via short-range wireless communication and enables data communication with the portable terminal 5.

The scanner storage unit 13 is a storage device that includes a Read Only Memory (ROM) including an area storing various kinds of programs and data necessary for processing, a Random Access Memory (RAM) including a work area, a Hard Disk Drive (HDD) as an auxiliary storage device, and similar memory.

The scanner control unit 15 is an arithmetic processing unit as a computer such as a Central Processing Unit (CPU), and performs control processing of respective units of the scanner 3 by executing the programs. An arithmetic processing unit is a processor having one or more circuits, can load the various programs to execute, and also can execute the various programs incorporated inside in advance. Here, the circuit may be an electronic component or an electronic substrate to which a plurality of electronic elements are connected through wiring. By executing the programs inside the scanner storage unit 13, the scanner control unit 15 of Embodiment 1 functions as a scan-execution instruction unit 17, a scanned-image data generating unit 19, and a scanned-image data transmitting unit 21.

The scan-execution instruction unit 17 achieves a scan-execution instruction function and causes the scanner main unit 7 to perform execution processing of reading of a document image by receiving a reading instruction (hereinafter referred to as "scanning instruction") of the document image from the portable terminal 5.

The scanned-image data generating unit 19 achieves a scanned-image data generating function and performs processing of generating scanned image data that corresponds to the document image corresponding to the scanning instruction, based on the electrical signal by reading of the document image in the scanner main unit 7.

The scanned-image data generating unit 19 of Embodiment 1 generates single scanned image data with one page when the document image is one paper sheet (one page), and performs processing of generating single scanned image data over a plurality of pages when the document image is a plurality of paper sheets (a plurality of pages).

The scanned-image data transmitting unit 21 achieves a scanned-image data transmitting function and performs processing of transmitting the generated scanned image data to the portable terminal 5, which is a transmission source of a scanning instruction.

The portable terminal 5 is a mobile phone such as a so-called smart phone or a portable information processing terminal such as a tablet terminal and has functions such as a camera function, a network function, and a sending and receiving function of e-mail. The functions such as the camera function, the network function, and the sending and receiving function of e-mail are well-known, and thus detailed description will be omitted.

The portable terminal 5 of Embodiment 1 can function as an operating device relative to the scanner 3 and includes an operation panel 23, a network interface 25, a short-range wireless interface 27, a terminal storage unit 29, a terminal control unit 31, and similar unit (see FIG. 1).

The operation panel 23 has a touch panel type screen or similar and is a device where an operation unit and a display unit of the portable terminal 5 are integrated. The operation panel 23 accepts operation input relative to the portable terminal 5 and displays an operating state. Both of the operation unit and the display unit of the portable terminal 5 can be also separately located. Embodiment 1 includes a button 33 for operation input other than the operation panel 23.

The network interface 25 is a module that connects the portable terminal 5 to a network such as the Internet via wired or wireless communication and enables data communication with the scanner 3.

The short-range wireless interface 27 is a module that connects the portable terminal 5 to the scanner 3 via short-range wireless communication and enables data communication with the scanner 3.

The terminal storage unit 29 is a storage device including a ROM, a RAM, a HDD and similar memory and includes an area storing the image data. The image data is acquired by a camera function, sharing with use of a network function, reception by an e-mail function, or similar function. The terminal storage unit 29 is also referred to simply as a storage circuit.

The terminal control unit 31 is an arithmetic processing unit as a computer such as a CPU. An arithmetic processing unit is a processor having one or more circuits, can load the various programs to execute, and also can execute the various programs incorporated inside in advance. Here, the circuit may be an electronic component or an electronic substrate to which a plurality of electronic elements are connected through wiring. The terminal control unit 31 of Embodiment 1, by executing the programs (applications) inside the terminal storage unit 29, functions as various units described as follows: a communication unit 35 (also referred to as a communication circuit); a reading instruction unit 37 (also referred to as a reading instruction circuit); a combination designating unit 39; a target-selection accepting unit 41 (also referred to as a target-selection accepting circuit); a destination-designation accepting unit 43; a scanned-image data acquiring unit 45 (also referred to as a scanned-image data acquiring circuit); a combined-image data generating unit 47 (also referred to as a combined-image data generating circuit); and a data transmitting unit 49 (also referred to as a data transmitting circuit).

The communication unit 35 achieves a communication function and connects the portable terminal 5 to the scanner 3 via the network interface 25 or the short-range wireless interface 27 to performs processing of setting the portable terminal 5 in a state enabling data communication with the scanner 3.

The reading instruction unit 37 achieves a reading instruction function and performs instruction processing of reading of the document image relative to the scanner 3. The reading instruction unit 37 accepts a scan setting relative to the scanner 3 on the operation panel 23 and performs processing of transmitting the accepted scan setting to the scanner 3 as the scanning instruction.

The scan setting includes an image resolution setting, a color setting, a data format setting, and similar setting, and is a setting for acquiring scanned image data that a user desires.

The combination designating unit 39 achieves a combination designating function and accepts a designation of generation of combined image data, which is described later at the time of a scan setting. The combination designating unit 39 performs processing of turning on a generation flag inside the terminal storage unit 29.

The target-selection accepting unit 41 achieves a target-selection accepting function and performs processing of accepting a selection of target image data that becomes a combining target relative to the scanned image data from the image data inside the terminal storage unit 29 at the time of the scan setting. Selection information of the accepted target image data is stored inside the terminal storage unit 29.

The target-selection accepting unit 41 selectably performs thumbnail display (list display) of images (hereinafter referred to as "insertion candidate image"), which are based on a plurality pieces of image data inside the terminal storage unit 29, on the operation panel 23 to perform acceptance of the selection of the target image data.

Figure 2:
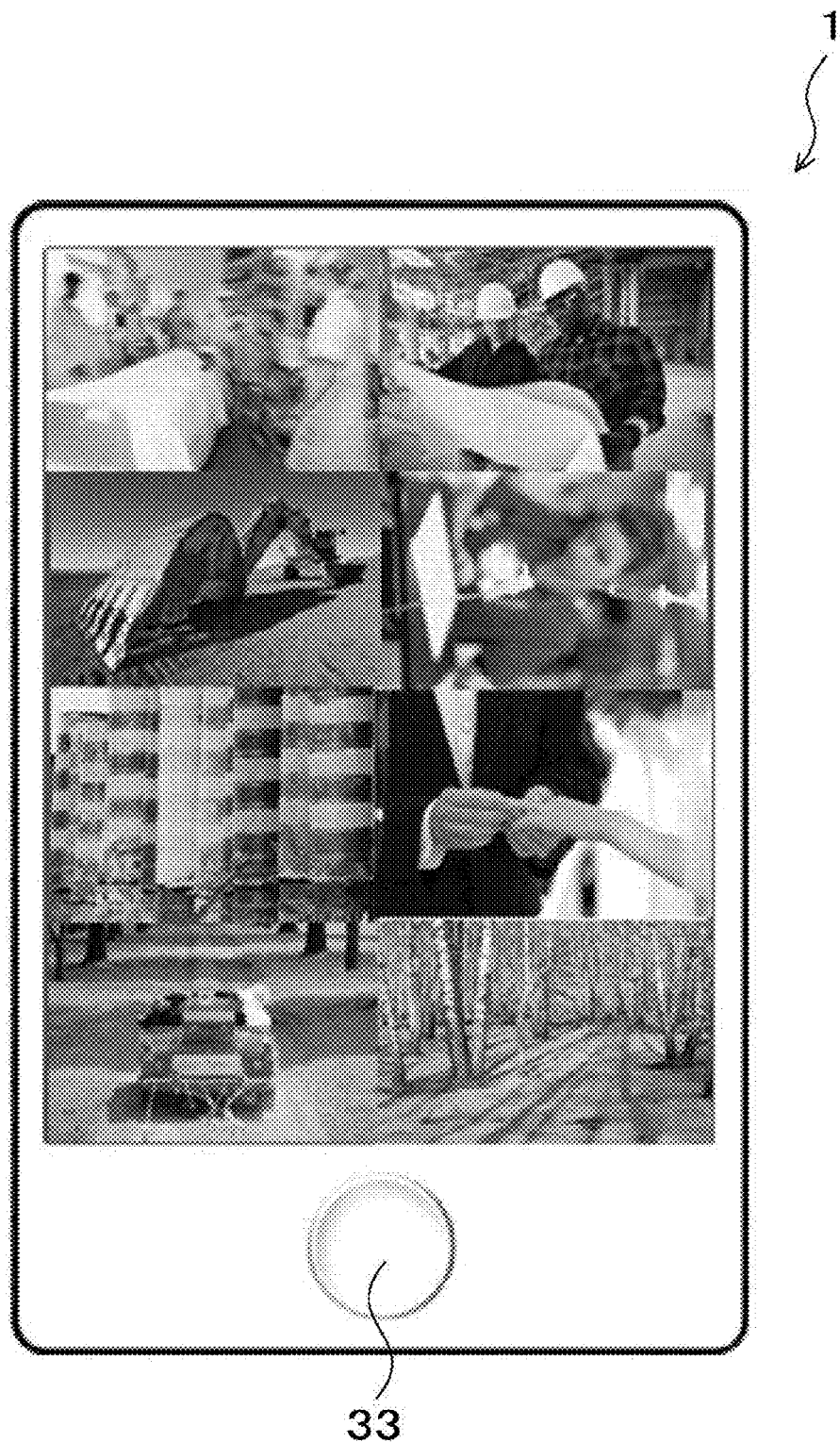
FIG. 2 illustrates an exemplary thumbnail display of insertion candidate images based on image data inside the portable terminal according to Embodiment 1.

FIG. 2 illustrates an exemplary thumbnail display. The example of FIG. 2 displays eight insertion candidate images in total with four insertion candidate images in the respective left and right columns. The insertion candidate images of the thumbnail display are displayed in any number at a time.

The destination-designation accepting unit 43 achieves a destination-designation accepting function and performs processing of accepting a destination setting of the combined image data at the time of the scan setting. Transmission of the combined image data is performed by an e-mail as described later, and thus the destination-designation accepting unit 43 accepts input of an e-mail address, which becomes a destination. The accepted e-mail address is stored inside the terminal storage unit 29 as destination information.

The scanned-image data acquiring unit 45 achieves a scanned-image data acquiring function and performs processing of acquiring the scanned image data generated by reading at the scanner 3, from the scanner 3. The scanned-image data acquiring unit 45 of Embodiment 1 receives the scanned image data transmitted from the scanner 3 corresponding to the scanning instruction to perform processing of acquiring.

The combined-image data generating unit 47 achieves a combined-image data generating function and performs processing of generating single combined image data with a plurality of pages, by combining the scanned image data acquired by the scanned-image data acquiring unit 45 with the target image data, the selection of which has been accepted by the target-selection accepting unit 41. This ensures that the combined-image data generating unit 47 acquires the combined image data instead of the scanned image data.

If the generation flag inside the terminal storage unit 29 is turned on when the scanned image data is acquired, the combined-image data generating unit 47 of Embodiment 1 refers to the selection information inside the terminal storage unit 29 and performs processing of generating the combined image data by the corresponding target image data and the acquired scanned image data.

Figure 3:
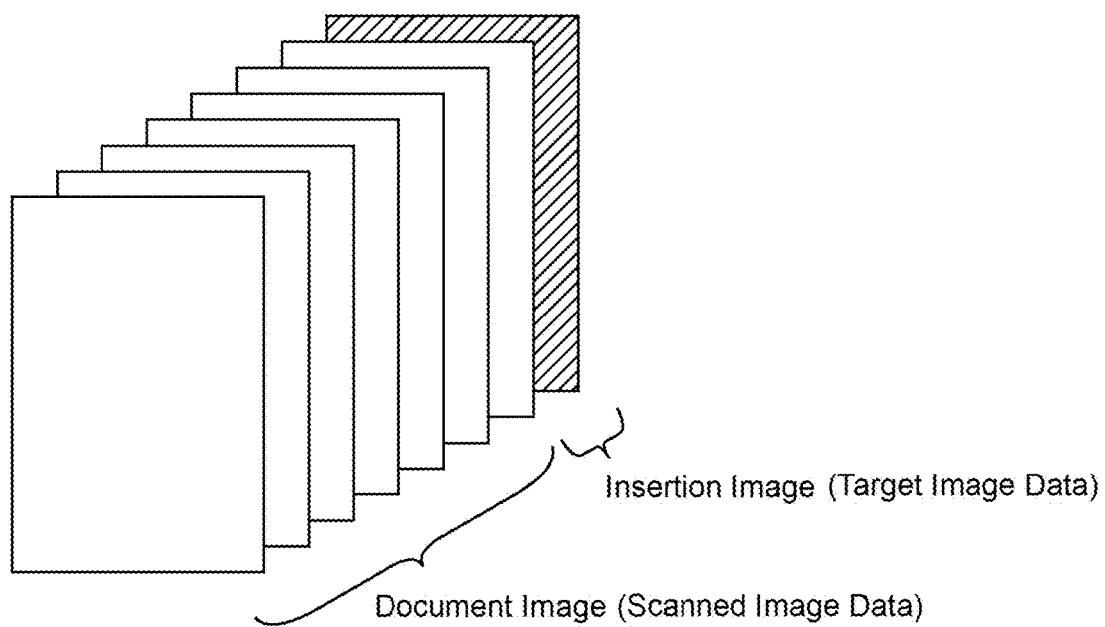
FIG. 3 illustrates an example of combined image data according to Embodiment 1.

FIG. 3 illustrates an exemplary generated combined image data. The example in FIG. 3 inserts an insertion image of the target image data next to the last page of an image (hereinafter referred to as a "document image" in some cases) based on the scanned image data. The insertion image means the image selected from the insertion candidate image.

Although the insertion position of the insertion image of Embodiment 1 is set next to the last page of the document image as a default setting as illustrated in FIG. 3, the insertion position may be set at the time of the scan setting. The default setting of the insertion position of the insertion image may be set different from the above-described setting, such as a position before the first page of the document image.

The data transmitting unit 49 achieves a data transmitting function and performs processing of transmitting combined image data to a designated destination. Embodiment 1 acquires destination information inside the terminal storage unit 29 corresponding to generation of combined image data and performs processing of transmitting an e-mail including the combined image data to the address based on the destination information.

Image Combining Processing

Figure 4:
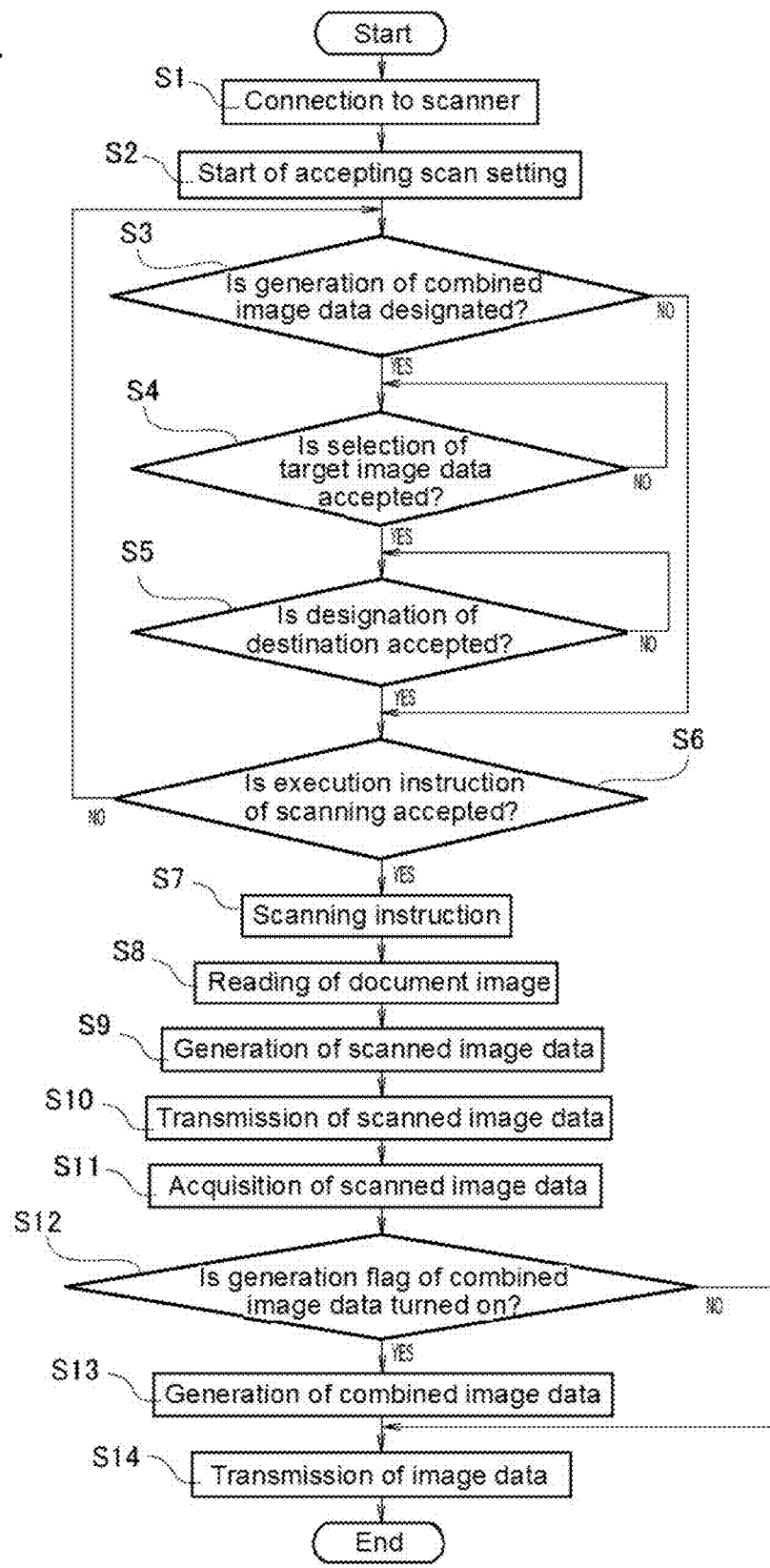
FIG. 4 illustrates steps of an image combining processing by the image combining system according to Embodiment 1.

FIG. 4 illustrates steps of an image combining processing according to the image combining system in FIG. 1.

The image combining processing starts by causing applications to be activated by a user's operation of the portable terminal 5. A document image is kept to be set in the scanner 3 when the image combining processing is started.

First, in Step S1, "connection to a scanner" is executed at the portable terminal 5 side. Namely, the communication unit 35 of the portable terminal 5 connects the portable terminal 5 to the scanner 3 via the network interface 25 or the short-range wireless interface 27, corresponding to the activation of the applications. The portable terminal 5 side executes the processes from Step S1 up to Step S7.

Next, in Step S2, "start of accepting a scan setting" is executed. Namely, the reading instruction unit 37 displays a scan setting screen on the operation panel 23 and starts accepting a scan setting by a user's operation.

In Step S3, determination of "Is generation of combined image data designated?" is executed. Namely, the combination designating unit 39 accepts the designation of the generation of the combined image data by the user's operation on the scan setting screen.

When the generation of the combined image data is designated, the combination designating unit 39 turns on the generation flag inside the terminal storage unit 29, and the process proceeds to Step S4 (YES). On the other hand, when the generation of the combined image data is not designated, the process proceeds to Step S6 (NO).

In Step S4, the determination of "Is selection of target image data accepted?" is executed. Namely, the target-selection accepting unit 41 displays insertion candidate images, which are based on the image data inside the terminal storage unit 29, in thumbnail images as illustrated in FIG. 2, and accepts the selection of the target image data, corresponding to the user's operation on the scan setting screen. Selecting one or more pieces of target image data is possible. Performing the thumbnail display in FIG. 2 may be triggered by the designation of the generation of the combined image data in Step S3.

When the selection of the target image data is accepted, the selection information is stored inside the terminal storage unit 29, and the process proceeds to Step S5 (YES). On the other hand, the process repeats the determination of Step S4 unless the selection of the target image data is accepted (NO). When repeating Step S4, the process maintains the thumbnail display when the thumbnail display is already being performed.

In Step S5, a determination of "Is designation of a destination accepted?" is executed. Namely, the destination-designation accepting unit 43 accepts input of an e-mail address that becomes the destination of the combined image data by the user's operation on the scan setting screen.

When the input of the e-mail address is accepted, the accepted e-mail address is stored inside the terminal storage unit 29 as destination information, and the process proceeds to Step S6 as the designation of the destination is accepted. On the other hand, the process repeats the determination of Step S5 unless the input of an e-mail address is accepted.

In Step S6, a determination of "Is execution instruction of scanning accepted?" is executed. Namely, the reading instruction unit 37 determines whether or not the execution instruction input of the scanning relative to the scanner 3 is accepted, by the operation on the scan setting screen.

When the execution instruction of the scanning is accepted, the scan setting is confirmed, and the process proceeds to Step S7 (YES). The process returns to Step S3 and repeats the process unless an execution instruction is accepted (NO).

In Step S7, "Scanning instruction" is executed. Namely, the reading instruction unit 37 transmits the confirmed scan setting to the scanner 3 as the scanning instruction, corresponding to the execution instruction in Step S6.

After the transmission of the scanning instruction, "Reading of document image" is executed at the scanner 3 side in Step S8. Namely, the scan-execution instruction unit 17 of the scanner 3 causes reading of the document image set in the scanner main unit 7 to be executed, corresponding to the scanning instruction received from the portable terminal 5. The scanner 3 side executes the processes from Step S8 up to Step S10.

In Step S9, "Generation of scanned image data" is executed. Namely, the scanned-image data generating unit 19 generates single scanned image data based on a reading signal of the document image in the scanner main unit 7. The scanned image data is data with image resolution, color, a data format, and similar property based on the scanning instruction.

The scanned image data of Embodiment 1 is data over a plurality of pages as illustrated in FIG. 3. However, scanned image data may be data with a single page.

Next, in Step S10, "Transmission of scanned image data" is executed. Namely, the scanned-image data transmitting unit 21 transmits the scanned image data generated in Step S9 to the portable terminal 5.

Corresponding to this, "Acquisition of scanned image data" is executed in Step S11, at the portable terminal 5 side. Namely, the scanned-image data acquiring unit 45 of the portable terminal 5 receives and acquires the scanned image data transmitted from the scanner 3 in Step S10. When the scanned image data is acquired, the communication unit 35 releases connection to the scanner 3, and the process proceeds to Step S12. The portable terminal 5 executes the processes after Step S11.

In Step S12, a determination of "Is generation flag of combined image data turned on?" is executed. Namely, the combined-image data generating unit 47 determines whether or not the generation flag inside the terminal storage unit 29 is turned on.

When the generation flag is turned on, the process proceeds to Step S13 (YES). When the generation flag is turned off, the process proceeds to Step S14 (NO).

In Step S13, "Generation of combined image data" is executed. Here, first, the combined-image data generating unit 47 acquires the target image data selected in Step S4 based on the selection information inside the terminal storage unit 29.

Then, the combined-image data generating unit 47 generates the single combined image data with a plurality of pages as illustrated in FIG. 3, by combining the scanned image data acquired in Step S11 with the target image data. When a plurality of pieces of target image data are selected, the plurality of pieces of target image data are combined with the scanned image data based on a selection order or similar order.

Next, in Step S14, "Transmission of image data" is executed. Namely, the data transmitting unit 49 acquires the destination information from the terminal storage unit 29, creates an e-mail, the destination of which is the e-mail address based on the acquired destination information, and then transmits the e-mail. The combined image data generated in Step S13 is attached to the e-mail. This ensures transmission of the combined image data to the designated destination by the e-mail.

When the process proceeds from Step S12 to Step S14 without generating combined image data, the scanned image data is transmitted to the designated destination. In this case, if target image data is additionally selected, the scanned image data and the target image data are consequently transmitted to the designated destination as separate data.

Thus, the image combining processing of Embodiment 1 terminates by execution of transmission of image data.

In the above-described image combining processing, although the selection of the target image data in Step S4 and the designation of the destination in Step S5 are executed at the time of the scan setting, they can be executed after acquiring scanned image data from the scanner 3.

For example, the selection of the target image data in Step S4 may be executed based on the generation flag being turned on, after Step S12. The designation of the destination in Step S5 may be executed based on the generation of the combined image data, after Step S13.

Effect of Embodiment 1

As described above, the portable terminal 5 of Embodiment 1 includes the following: the terminal storage unit 29 storing image data; the communication unit 35 enabling data communication with the scanner 3, which generates scanned image data by reading a document image; the reading instruction unit 37 instructing reading of a document image relative to the scanner 3; the target-selection accepting unit 41 accepting selection of target image data from the image data inside the terminal storage unit 29; the scanned-image data acquiring unit 45 acquiring scanned image data, which is generated by reading of a document image at the scanner 3, from the scanner 3; and the combined-image data generating unit 47 generating single combined image data with a plurality of pages by combining scanned image data with target image data, and acquiring the combined image data instead of the scanned image data.

Accordingly, in Embodiment 1, combined image data can be acquired instead of scanned image data, by combining target image data stored in the portable terminal 5 and scanned image data by the scanner 3 as single combined image data with a plurality of pages.

This ensures handling target image data and scanned image data as single data, from the time of generation of combined image data until the time of using the combined image data thereafter, and improvement of convenience at the time of use at the portable terminal 5.

Especially, the portable terminal 5 of Embodiment 1 can improve handleability and convenience by the single combined image data when transmitting combined image data to a designated destination by the data transmitting unit 49.

Other terminals, which are destination of the transmission, can perform operations such as browsing of the transmitted combined image data as single data, and thus this ensures improvement of the convenience at the time of use at the other terminals.

The portable terminal 5 of Embodiment 1 functions as an operating device relative to the scanner 3 and can accept selection of target image data as a part of a scan setting (scanning instruction) for instructing reading of a document image. This ensures automatic execution of generation of combined image data after completion of a scanning instruction.

Furthermore, in Embodiment 1, designation of a destination is performed as a part of a scanning instruction, and thus, this operation can be automatically executed up to the processing where the combined image data is transmitted to a designated destination.

Image Combining System of Embodiment 2

Figure 5:
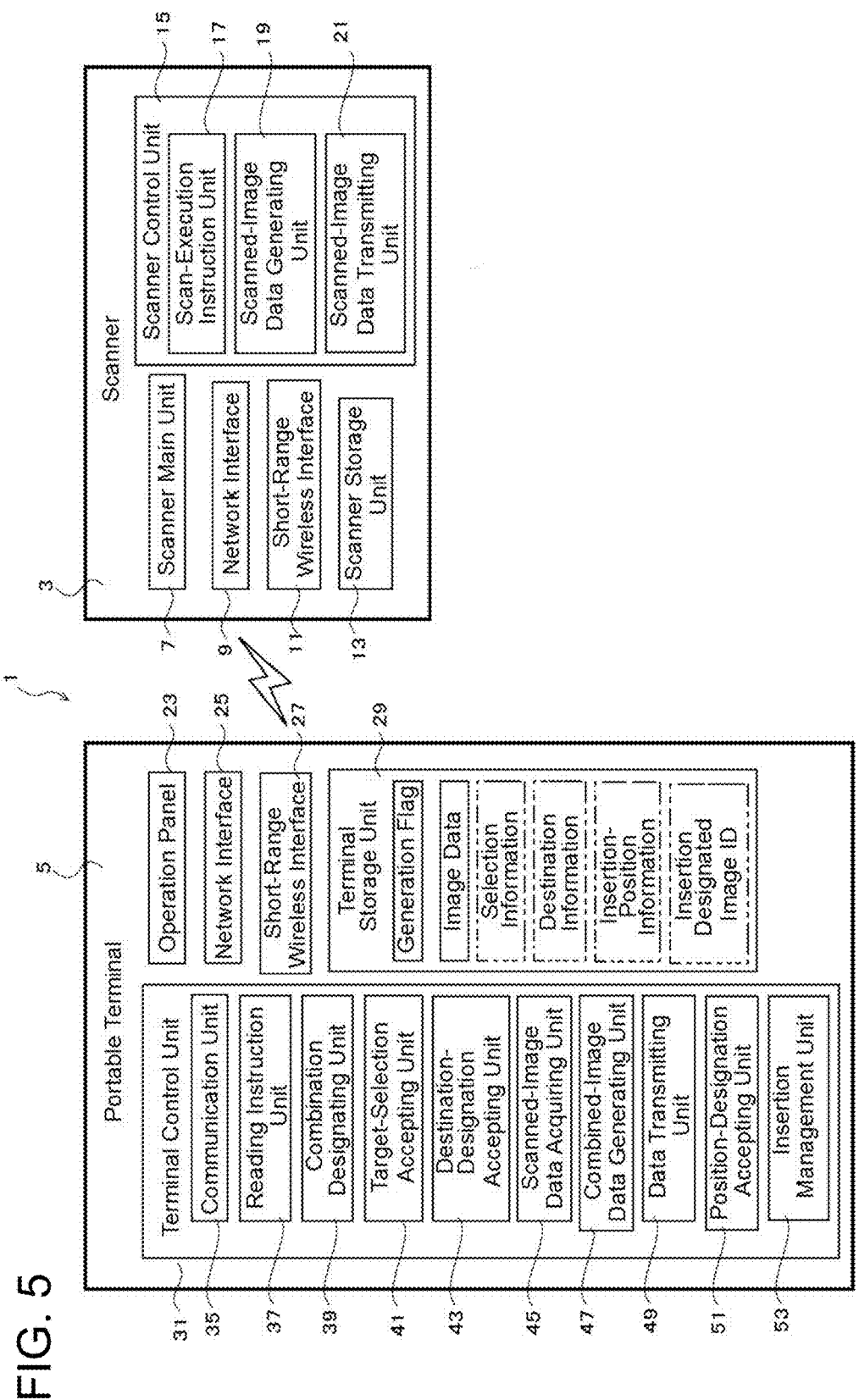
FIG. 5 illustrates an image combining system using a portable terminal according to Embodiment 2 of the disclosure.

FIG. 5 illustrates an image combining system using a portable terminal according to Embodiment 2 of the disclosure. The image combining system of Embodiment 2 has a basic configuration in common with that of Embodiment 1, and thus the repeated description will be omitted.

An image combining system 1 of Embodiment 2 can insert an insertion image before or after a specific page of a document image based on scanned image data, by designating an insertion position of an insertion image based on target image data. This ensures that the terminal control unit 31 of the portable terminal 5 functions also as a position-designation accepting unit 51 and an insertion management unit 53. The position-designation accepting unit 51 is also referred to as a position-designation accepting circuit.

The position-designation accepting unit 51 achieves a position-designation accepting function and performs processing of accepting designation of the insertion position of the insertion image of the selected target image data relative to the document image of the scanned image data. Accepted insertion-position information is stored in the terminal storage unit 29. Insertion of an insertion image is referred to as "insertion of target image data" in some cases, for convenience.

The position-designation accepting unit 51 of Embodiment 2 performs processing of accepting input of a page number as the insertion position relative to the document image of the scanned image data, corresponding to the selection of the target image data.

Figure 6:
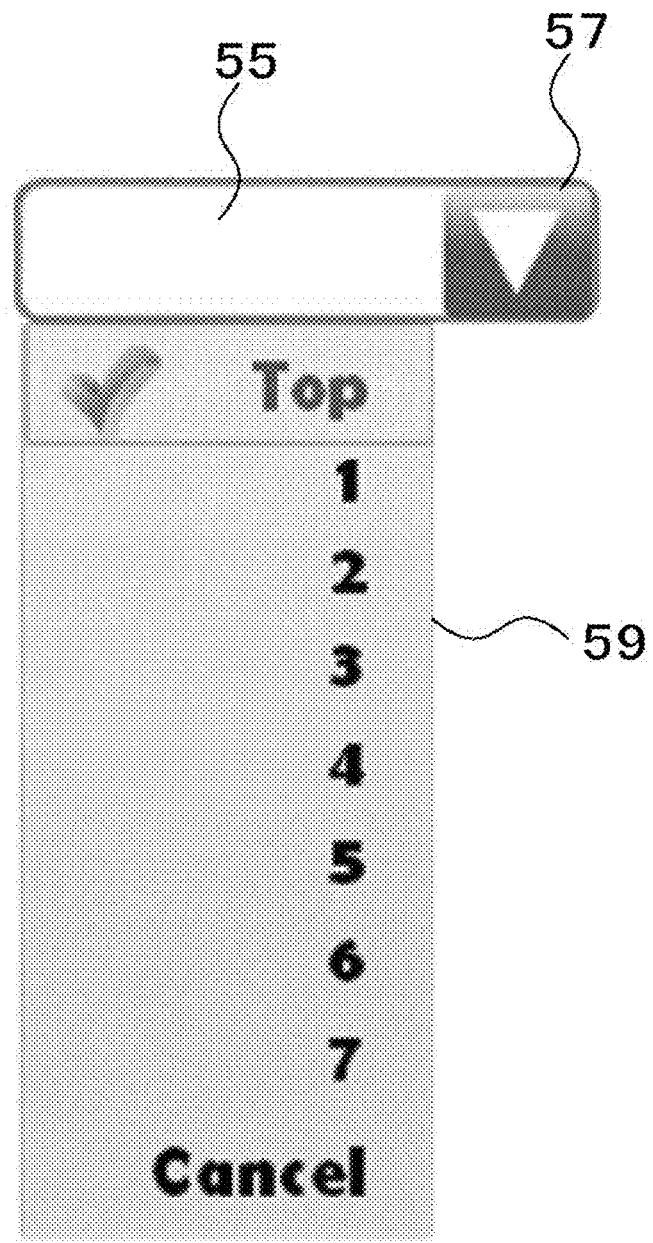
FIG. 6 illustrates an exemplary dropdown list as an insertion position list of scanned image data according to Embodiment 2.

The input of the page number can be achieved by the operation such as a text input or a selection from a dropdown list. FIG. 6 illustrates an exemplary dropdown list as an insertion position list.

The example in FIG. 6 displays a dropdown button 57 adjacent to an input box 55 for the page number and displays a dropdown list 59 when the dropdown button 57 is selected. The dropdown list 59 enables selection of characters of "TOP" and "Cancel" and numerals from "1" to "7." The character "TOP" indicates that an insertion position of an insertion image is a position of a front page of document images. The numerals from "1" to "7" indicate that an insertion position of an insertion image is next to a page corresponding to a numeral when scanned image data has seven pages in total. The character "Cancel" indicates that insertion of a target image is not performed.

The insertion management unit 53 achieves an insertion management function and manages insertion of an insertion image of target image data into document images of scanned image data.

Selection of a plurality of target image data is possible. Thus, the target image data, which is selected and the insertion position of which is designated, is required to be identified in selection and designation of an insertion position of the next target image data.

In view of this, in Embodiment 2, the insertion management unit 53 gives selected image identification information (hereinafter referred to as an "insertion designated image ID") relative to the target image data, which is selected and the insertion position of which is designated. For example, the insertion designated image ID is an alphabet starting from "A" and is given to the target image data based on a selected order.

The insertion management unit 53 stores the given insertion designated image ID inside the terminal storage unit 29. The stored insertion designated image ID is indicated on the thumbnail display and added to the dropdown list 59 when an insertion position for the next target image data is designated.

Figure 7:
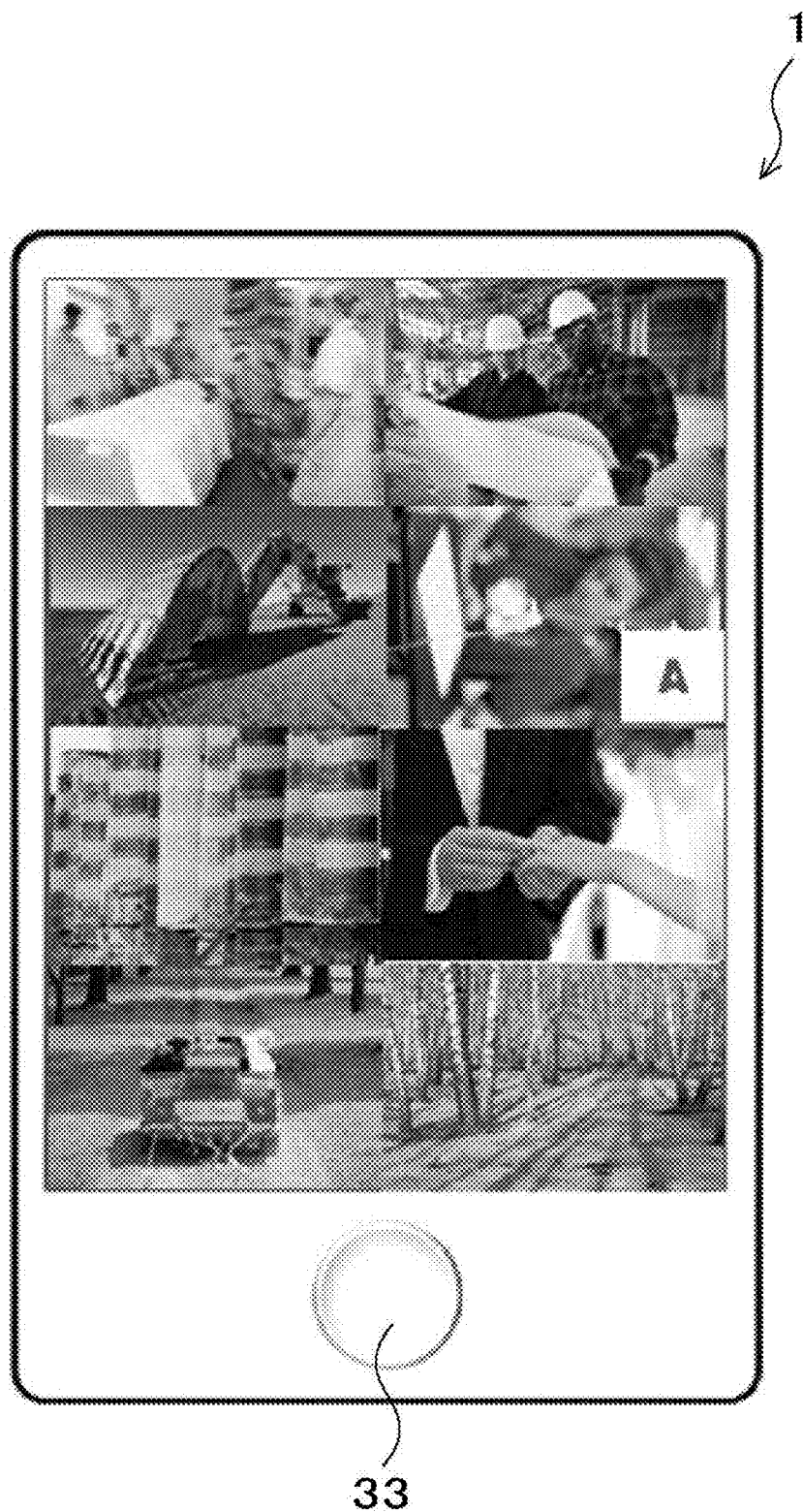
FIG. 7 illustrates an exemplary thumbnail display of an insertion candidate image with an insertion designated image ID indicated, according to Embodiment 2.

FIG. 7 illustrates an exemplary thumbnail display with an insertion designated image ID indicated. The example in FIG. 7 is a case where one piece of target image data is selected, and the insertion position is designated, and displays "A" as the insertion designated image ID in the insertion image on the corresponding thumbnail display.

Figure 8:
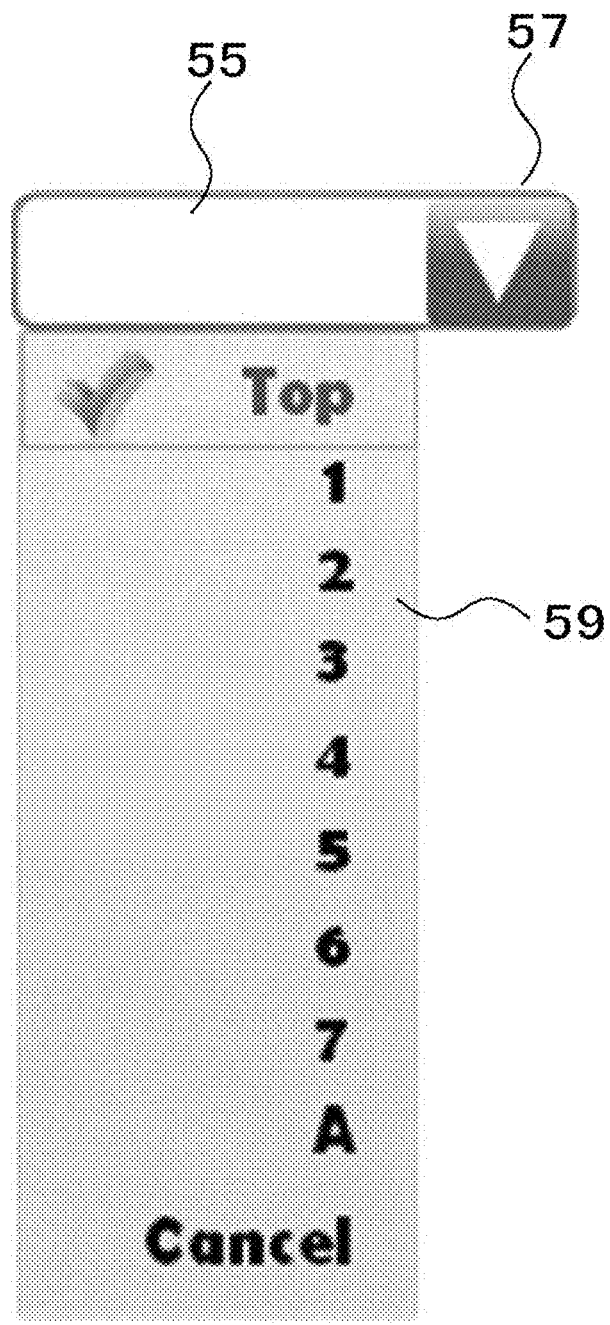
FIG. 8 illustrates an exemplary dropdown list with the insertion designated image ID added, according to Embodiment 2.

FIG. 8 illustrates an exemplary dropdown list with the insertion designated image ID added. In the example in FIG. 8, the insertion position of the insertion image is next to the last page of the document image. Thus, the example in FIG. 8 adds "A", which is the insertion designated image ID of the insertion image, next to "7" that is the page number of the last page.

Insertion-Position Designating Processing

Figure 9:
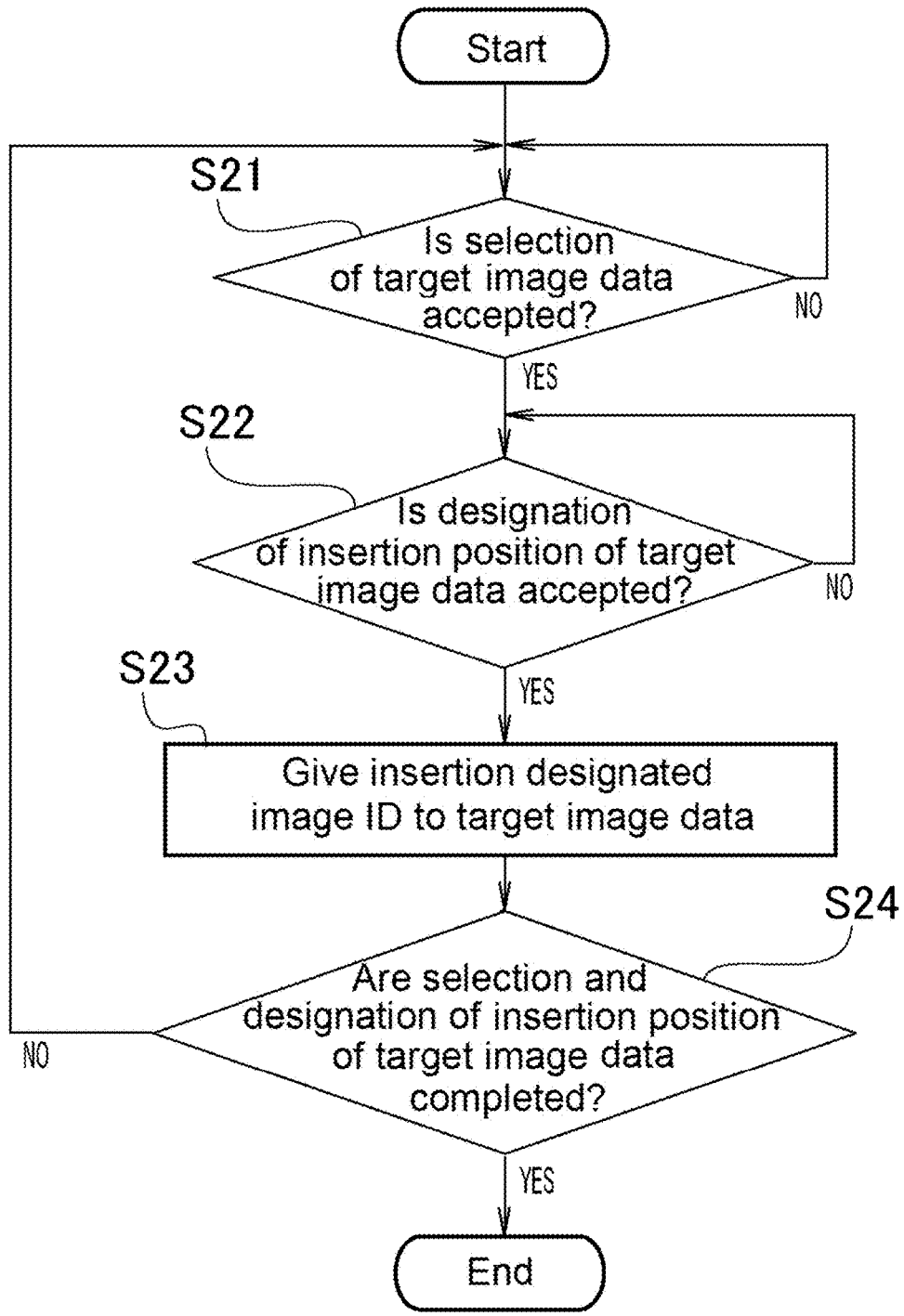
FIG. 9 illustrates steps of an insertion-position designating processing according to Embodiment 2.

FIG. 9 illustrates steps of an insertion-position designating processing.

The insertion-position designating processing can be executed at the time of the scan setting or after acquisition of scanned image data. When executed at the time of the scan setting, it is only necessary to execute the insertion-position designating processing instead of Step S4 in FIG. 4 of Embodiment 1. When executed after the acquisition of scanned image data, it is only necessary to execute the insertion-position designating processing after Step S12 in FIG. 4.

It is only necessary to trigger a start of the insertion-position designating processing by user's operation on the scan setting screen when executed at the time of the scan setting, and by confirmation of the generation flag of scanned image data, which is turned on, when executed after the acquisition of scanned image data.

In Step S21, a determination of "Is selection of target image data accepted?" is executed similarly to Step S4 in FIG. 4. When the selection of the target image data is accepted, the process proceeds to Step S22 (YES). The process repeats the process of Step S21 unless the selection of the target image data is accepted (NO).

Next, In Step S22, a determination of "Is designation of insertion position of target image data accepted?" is executed. Namely, the position-designation accepting unit 51 displays the input box 55 and the dropdown button 57 in FIG. 6, and accepts the input of the page number in the scanned image data from the dropdown list 59.

When an insertion-position designating processing is executed at the time of the scan setting, by causing a page number of the document image to be entered in the scan setting, it is only necessary to accept the input of the page number from the dropdown list 59 based on the entered number of pages. Further, when the insertion-position designating processing is executed after the acquisition of scanned image data, it is only necessary to accept the input of the page number from the dropdown list 59 based on the number of pages of the scanned image data.

When the insertion position is designated, the position-designation accepting unit 51 stores the insertion-position information inside the terminal storage unit 29, and the process proceeds to Step S23 (YES). On the other hand, when the insertion position is not designated, the process repeats the process of Step S22 (NO).

In Step S23, "Give insertion designated image ID to target image data" is executed. Namely, the insertion management unit 53 of the portable terminal 5 gives the insertion designated image ID the target image data, the insertion position of which has been designated in Step S22, and stores the given insertion designated image ID inside the terminal storage unit 29.

In Step S24, the determination of "Are selection and designation of insertion position of target image data completed?" is executed. Namely, the insertion management unit 53 of the portable terminal 5 determines whether or not the selection and the designation of the insertion position of a sequence of the target image data are completed. It is only necessary to determine this from determination of whether or not a button such as a complete button displayed on the operation panel 23 is selected, or similar determination.

When the selection and the designation of the insertion position of the target image data are completed, the insertion-position designating processing terminates (YES). When the selection and the designation of the insertion position of the target image data are not completed, the process returns to Step S21 (NO).

After the insertion-position designating processing terminates, the process proceeds to Step S5 in FIG. 4 when executed at the time of the scan setting, and proceeds to Step S13 when executed after the acquisition of scanned image data. When executed at the time of the scan setting, it is possible to omit the determination in Step S24.

Then, when combined image data is generated, the combined-image data generating unit 47 refers to the insertion-position information, the insertion image ID, and similar information inside the terminal storage unit 29 and subsequently inserts the insertion image in the designated insertion position.

In Step S21 after returning from Step S24, the target-selection accepting unit 41 displays the insertion designated image ID of the target image data, the insertion position of which is already designated as illustrated in FIG. 7, on the thumbnail display, and accepts selection of next target image data.

Next, in Step S22, the position-designation accepting unit 51 adds the insertion designated image ID of the target image data, the insertion position of which is designated in Step S22 as illustrated in FIG. 8, to the dropdown list 59 and displays the input box 55 and the dropdown button 57.

This ensures that a user designates the insertion position of the next target image data while recognizing the target image data, the insertion position of which is already designated.

Effect of Embodiment 2

As described above, the portable terminal 5 of Embodiment 2 includes the position-designation accepting unit 51 that accepts the designation of the insertion position of the insertion image of the selected target image data relative to the document image of the scanned image data and thus can acquire the combined image data, the result of which a user desires, with more certainty.

The position-designation accepting unit 51 of Embodiment 2 accepts the insertion position of the insertion image by selecting the page number from the dropdown list 59, which is the insertion position list, and adds the insertion designated image ID of the target image data, the insertion position of which is already designated, to the dropdown list 59.

Accordingly, in Embodiment 2, when a plurality of target image data are selected, and the insertion positions of the respective insertion images are designated, the insertion position of the insertion image of the next target image data can be appropriately designated while recognizing the target image data, the insertion position of which is already designated.

Further, the target-selection accepting unit 41 of Embodiment 2 displays the insertion designated image ID of the target image data, the insertion position of which is already designated, on the thumbnail display, which is an image list based on the image data inside the terminal storage unit 29.

Accordingly, Embodiment 2 can cause selection of the next target image data to be performed while the target image data, the insertion position of which is already designated, is being recognized.

In addition, Embodiment 2 can also achieve the operations and the effects similar to Embodiment 1 described above.

Image Combining System of Embodiment 3

Figure 10:
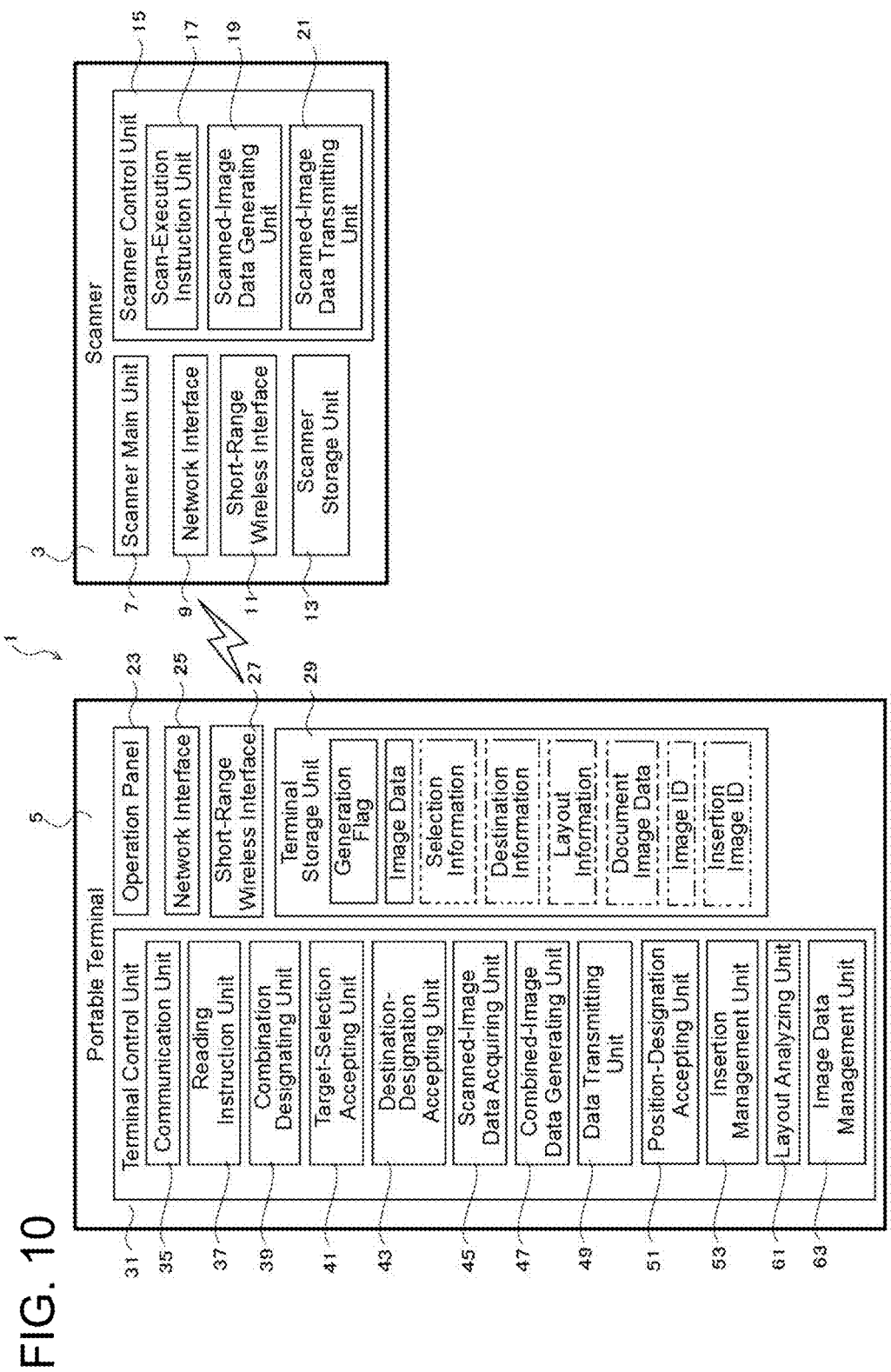
FIG. 10 illustrates an image combining system using a portable terminal according to Embodiment 3 of the disclosure.

FIG. 10 illustrates an image combining system using a portable terminal according to Embodiment 3 of the disclosure. The image combining system of Embodiment 3 has a basic configuration in common with that of Embodiment 2, and thus the repeated description will be omitted.

The image combining system 1 of Embodiment 3 combines target image data relative to scanned image data where a plurality of pages of a document image is aggregated as data with one page. Namely, Embodiment 3 analyzes a layout of scanned image data at the portable terminal 5, and inserts an insertion image of target image data before or after a specific page of the document image of the scanned image data based on an analyzed layout.

In view of this, the terminal control unit 31 of the portable terminal 5 of Embodiment 3 functions also as a layout analyzing unit 61 and an image data management unit 63. The layout analyzing unit 61 is also referred to as a layout analyzing circuit.

The layout analyzing unit 61 achieves a layout analyzing function and performs processing of analyzing the layout of the scanned image data acquired from the scanner 3. The layout that is analyzed is as follows: an aggregation number (2 in 1, 4 in 1, 9 in 1, and 16 in 1) of the document image in one page of the scanned image data; a proceeding order (an N type, an inverse N type, a Z type, and an inverse Z type) of the document image on the one page of the scanned image data; positions of respective pages of the document image on the one page of the scanned image data; and similar layout.

The layout analyzing unit 61 performs processing of storing the analyzed layout information in the terminal storage unit 29 together with the document image data of the respective pages of the document image and image identification information (hereinafter referred to as an "image ID") given to the respective pieces of document image data. The image ID of Embodiment 3 is a consecutive number such as "001", "002" . . . , or similar number sequentially given from the first page of the document image.

The image data management unit 63 achieves an image data management function and performs processing of managing the image data, which is stored inside the terminal storage unit 29, such that the image data is identifiable with one another. The image data management unit 63 of Embodiment 3 performs processing of giving insertion image identification information (hereinafter referred to as "insertion image ID") relative to the image data. The given insertion image ID is stored inside the terminal storage unit 29. The insertion image ID of Embodiment 3 is a consecutive number such as "1001", "1002" . . . , and so on.

Embodiment 3 enables combination of the target image data relative to the scanned image data, based on the information of the scanned image data acquired via these layout analyzing unit 61 and image data management unit 63 and information of the target image data stored in the terminal storage unit 29.

Combination in Embodiment 3 causes designation of the insertion position of the insertion image relative to the document image to be performed by switchably displaying a thumbnail display (insertion position list) of the document image and a thumbnail display (image list) of the insertion candidate image on the operation panel 23. In view of this, the insertion management unit 53 manages the thumbnail displays of the document image and the insertion candidate image.

Figure 11:
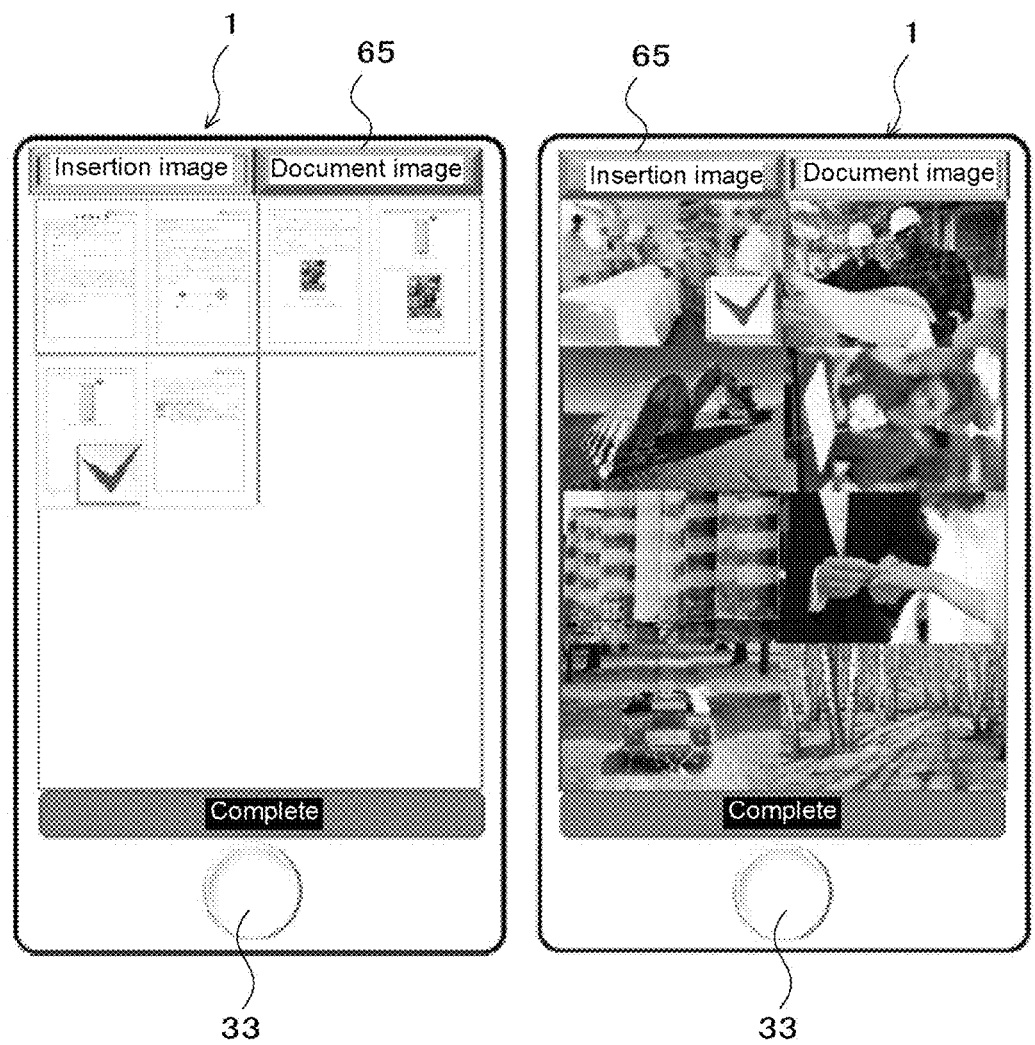
FIG. 11 illustrates an exemplary thumbnail display of document images in scanned image data and insertion candidate images in image data inside the portable terminal, according to Embodiment 3.

FIG. 11 illustrates an example of thumbnail displays of the document image of the scanned image data and the insertion candidate image of the target image data in parallel.

As illustrated in FIG. 11, the insertion management unit 53 causes the thumbnail display of the insertion candidate image by the target-selection accepting unit 41 and the thumbnail display of the document image by the position-designation accepting unit 51 to be switchably displayed by selection of a tab 65.

In FIG. 11, the left side thumbnail display is the document image, and the right side thumbnail display is the insertion candidate image. The thumbnail display of the document image displays the respective pages of the scanned image data by aggregating an image with a plurality of pages (two pages) of the document image, corresponding to the layout information or similar information. The respective pages of the scanned image data are referred to as a data page, and the page of the document image is referred to as a document page in some cases.

The thumbnail display of the document image can be performed based on the layout information in the terminal storage unit 29, the document image data, and the image ID. As for the image ID, a consecutive number from "001" to "006" is sequentially given to the document image data with total six pages, from the first page.

On the other hand, the thumbnail display of the insertion candidate image can be performed based on the insertion image ID and the image data inside the terminal storage unit 29. As for the insertion image ID, a consecutive number from "1001" to "1008" is sequentially given to the total eight pieces of the image data, corresponding to the order of the thumbnail display.

In designation of the insertion position, the target-selection accepting unit 41 accepts the selection of the insertion image in the thumbnail display of the insertion candidate image, and the position-designation accepting unit 51 accepts the designation of the insertion position in the thumbnail display of the document image.

In acceptance of the designation of the insertion position, the position-designation accepting unit 51 enables a user to select a document page inside the data page after selection of the data page. In a state where the data page is selected, the position-designation accepting unit 51 enables a user to select only the document page inside the selected data page.

Corresponding to the selection of the insertion position, the position-designation accepting unit 51 updates the thumbnail display of the document image by adding the insertion image in the designated insertion position in the thumbnail display of the document image.

In the example of FIG. 11, selecting the fifth page of the document page in the thumbnail display of the document image designates the next sixth page as the insertion position of the insertion image. Thus, the upper left image in the thumbnail display of the insertion candidate image becomes the selected insertion image.

Figure 12:
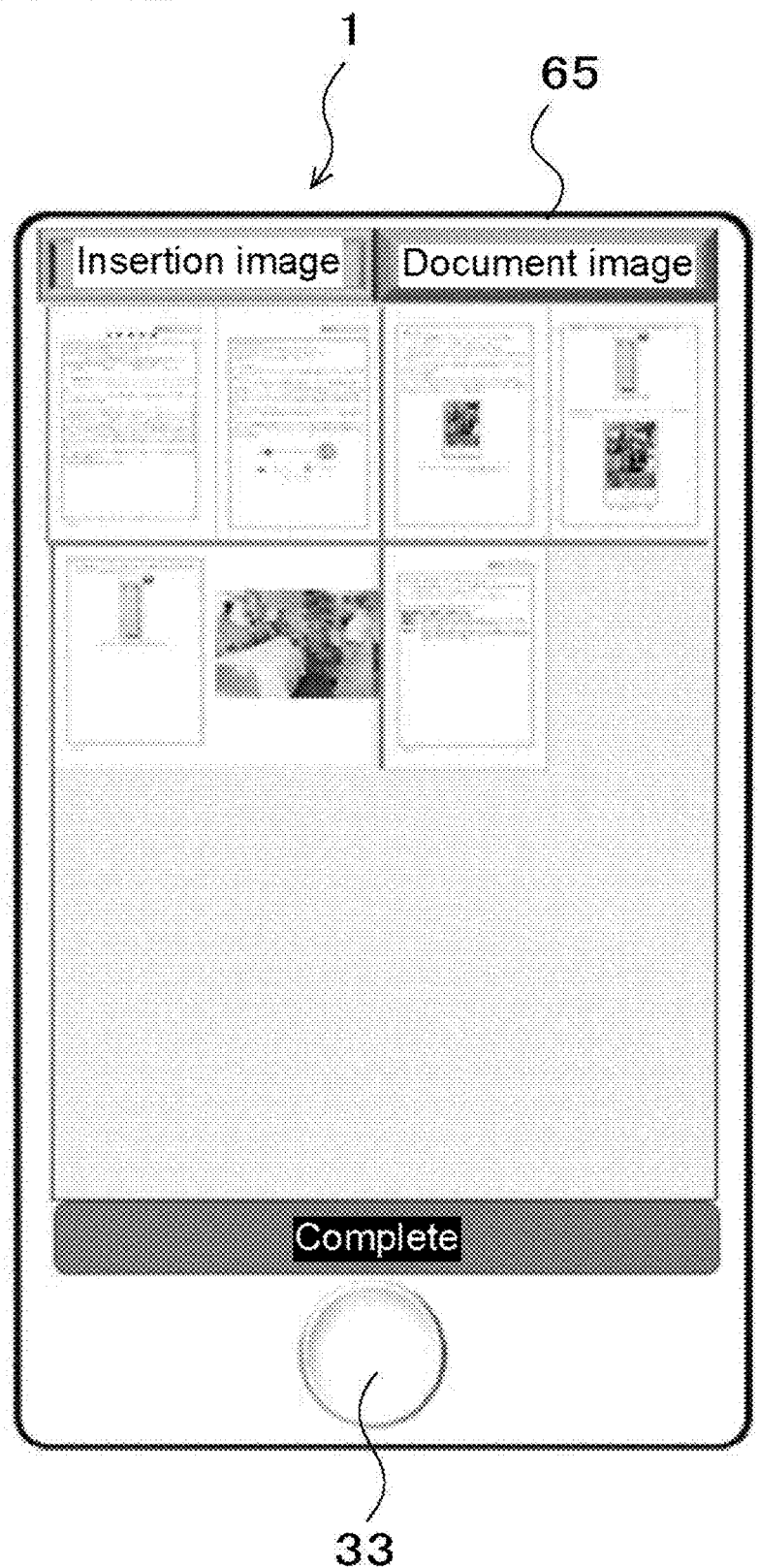
FIG. 12 illustrates an exemplary thumbnail display of updated document images according to Embodiment 3.

Corresponding to this, the selected insertion image is inserted into the fifth page of the document image in the thumbnail display of the post-update document image. FIG. 12 illustrates the thumbnail display of the post-update document image based on the example in FIG. 11.

The update of the thumbnail display of the document image can be achieved by insertion of the insertion image ID of the selected insertion image into the image ID of the document image, which is arrayed in an order of the page of the document image.

In the examples of FIGS. 11 and 12, the insertion image ID of the selected insertion image begins from "1001," and this insertion image ID is inserted into the next of the fifth image ID of the continuous document image. As a result, the array of the image ID of the post-update document image becomes "001", "002", "003", "004", "005", "1001", "006", including the insertion image ID.

Then, the position-designation accepting unit 51 can perform the thumbnail display of the updated document image as illustrated in FIG. 12, based on the image ID including the insertion image ID, the layout information, the document image data, and the image data of the insertion image.

Insertion-Position Designating Processing

FIG. 13 illustrates steps of an insertion-position designating processing.

The insertion-position designating processing of Embodiment 3 is executed after Step S12 in FIG. 4, after acquisition of the scanned image data. Accordingly, start of the insertion-position designating processing is triggered by confirmation of the generation flag, which is turned on, of the scanned image data.

In Step S31, a determination of "Is designation of insertion position of target image data accepted?" is executed. Namely, the insertion management unit 53 determines whether or not the image is selected as described above, in both of the thumbnail displays of the insertion image and the document image.

When the designation of the insertion position is accepted, the process proceeds to Step S32 with the selection of the complete button in FIG. 11 as a trigger (YES). When the designation of the insertion position is not accepted, the process repeats the determination in Step S31 (NO).

In Step S32, "Update of thumbnail display of document image" is executed. Namely, the position-designation accepting unit 51, as described above, inserts the selected insertion image into the thumbnail display of the document image and displays the updated document image in a state where the insertion image is inserted as illustrated in FIG. 12.

Next, in Step S33, a determination of "Is designation of insertion position of target image data completed?" is executed. Namely, the insertion management unit 53, similar to Step S24 in FIG. 9, determines whether or not the selection and the designation of the insertion position of a sequence of target image data are completed, by presence or absence of the selection of the complete button in FIG. 12 or similar operation. When the insertion position is not designated, it is only necessary to cause the complete button to function as a button that enters the completion of the selection and the designation of the insertion position of a sequence of target image data.

When the selection and the designation of the insertion position of the target image data are completed, the insertion-position designating processing terminates (YES). When the selection and the designation of the insertion position of the target image data are not completed, the process returns to Step S31 and repeats the processes (NO).

After the insertion-position designating processing terminates, the process proceeds to Step S13 in FIG. 4 and generates the combined image data based on update information of the thumbnail display of the document image.

Effect of Embodiment 3

As described above, the portable terminal 5 of Embodiment 3 includes the layout analyzing unit 61, which analyzes the layout of the scanned image data that aggregates a plurality of pages of the document image in the respective pages, and the combined-image data generating unit 47 generates the combined image data based on the analyzed layout.

Accordingly, in Embodiment 3, the combined image data can be generated even when a plurality of pages of the document image is aggregated in the respective pages of the scanned image data.

Further, in Embodiment 3, when the insertion position of the insertion image relative to the document image is designated, the thumbnail displays of the document image and the insertion image are switchably displayed on the operation panel 23. Thus, a user can easily and smoothly perform a designation operation.

Additionally, in Embodiment 3, after designating the page of the scanned image data, the position-designation accepting unit 51 accepts the designation of the page of the document image aggregated inside the designated page of the scanned image data. This ensures prevention of incorrect operation in designation of an insertion position of an insertion image.

In addition, Embodiment 3 can also achieve the operations and the effects similar to Embodiment 2.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A portable terminal, comprising:
    a storage circuit including an area storing image data;
    a communication circuit that ensures data communication with a scanner, the scanner reading a document image and generating scanned image data;
    a reading instruction circuit that instructs the scanner to read the document image;
    a target-selection accepting circuit that accepts selection of one or a plurality of target image data from the image data inside the storage circuit;
    a scanned-image data acquiring circuit that acquires the scanned-image data from the scanner, the scanned-image data being generated by the reading of the document image by the scanner;
    a position-designation accepting circuit that accepts designation of an insertion position of an image based on the selected target image data relative to an image based on the scanned image data; and
    a combined image data generating circuit that generates single combined image data with a plurality of pages by combining the scanned image data with the selected target image data so that the image based on the selected target image data is inserted into the insertion position, and acquires the combined image data instead of the scanned image data,
    wherein the position-designation accepting circuit accepts the designation of the insertion position by selection from a dropdown list as an insertion position list and adds identification information of the selected target image data to the dropdown list, the insertion position of the selected target image data being already designated, and
    the identification information is given to the selected target image data based on a selected order.

2. The portable terminal according to claim 1,
    wherein the target-selection accepting circuit displays the identification information of the selected target image data on an image list based on the image data inside the storage circuit, the insertion position of the selected target image data being already designated.

3. The portable terminal according to claim 1, further comprising
    a data transmitting circuit that transmits the combined image data to a designated destination.

4. The portable terminal according to claim 1, further comprising
    a layout analyzing circuit that analyzes a layout of scanned image data that aggregates a plurality of pages of the document image in each page,
    wherein the combined image data generating circuit generates the combined image data based on the analyzed layout,
    the position-designation accepting circuit accepts the designation of the insertion position based on a selected page of the document image, and
    the combined image data generating circuit generates the combined image data by reorganizing the layout so that the image based on the selected target image data is inserted, based on the insertion position, into a page of the scanned image data that aggregates the plurality of pages of the document image in each page.

5. A non-transitory computer-readable recording medium storing an image combining program to control a portable terminal, the image combining program causing the portable terminal to function as:
    a storage circuit including an area storing image data;
    a communication circuit that ensures data communication with a scanner, the scanner reading a document image and generating scanned image data;
    a reading instruction circuit that instructs the scanner to read the document image;
    a target-selection accepting circuit that accepts selection of one or a plurality of target image data from the image data inside the storage circuit;

a scanned-image data acquiring circuit that acquires the scanned-image data from the scanner, the scanned-image data being generated by the reading of the document image by the scanner;

a position-designation accepting circuit that accepts designation of an insertion position of an image based on the selected target image data relative to an image based on the scanned image data; and a combined image data generating circuit that generates single combined image data with a plurality of pages by combining the scanned image data with the selected target image data so that the image based on the selected target image data is inserted into the insertion position, and acquires the combined image data instead of the scanned image data, wherein the position-designation accepting circuit accepts the designation of the insertion position by selection from a dropdown list as an insertion position list and adds identification information of the selected target image data to the dropdown list, the insertion position of the selected target image data being already designated, and the identification information is given to the selected target image data based on a selected order.

6. An image combining method using a portable terminal including a storage circuit including an area storing image data, comprising:

performing data communication with a scanner, the scanner reading the document image and generating scanned image data;

instructing the scanner to read the document image;

accepting selection of one or a plurality of target image data from the image data inside the storage circuit;

acquiring the scanned-image data from the scanner, the scanned-image data being generated by the reading of the document image by the scanner;

accepting, by selection from a dropdown list as an insertion position list, designation of an insertion position of an image based on the selected target image data relative to an image based on the scanned image data;

adding identification information of the selected target image data to the dropdown list, the insertion position of the selected target image data being already designated; and generating single combined image data with a plurality of pages by combining the scanned image data with the selected target image data so that the image based on the selected target image data is inserted into the insertion position, and acquiring the combined image data instead of the scanned image data, wherein the identification information is given to the selected target image data based on a selected order.

* * * * *